Sept. 22, 1931. N. SOLTESZ Re. 18,207

ARTICLE OF FURNITURE

Original Filed Aug. 20, 1925 2 Sheets-Sheet 1

INVENTOR.
Nick Soltesz
BY
W. Woodard
ATTORNEY.

Sept. 22, 1931. N. SOLTESZ Re. 18,207

ARTICLE OF FURNITURE

Original Filed Aug. 20, 1925 2 Sheets-Sheet 2

INVENTOR.
Nick Soltesz
BY
W. F. Woodard
ATTORNEY.

Reissued Sept. 22, 1931

Re. 18,207

UNITED STATES PATENT OFFICE

NICK SOLTESZ, OF TOLEDO, OHIO, ASSIGNOR TO HANDY TABLE SET COMPANY, OF WEST ALLIS, WISCONSIN, A CORPORATION OF WISCONSIN

ARTICLE OF FURNITURE

Original No. 1,594,572, dated August 3, 1926, Serial No. 51,355, filed August 20, 1925. Application for reissue filed July 31, 1931. Serial No. 554,320.

This invention relates to furniture of the folding type.

The primary object of the invention is the provision of a table having an attached seat or bench on one, or both, of its opposite sides and suitable for use by campers and tourists, the whole being strong and durable and capable of being compactly folded together for storing, or for carrying, for instance, on the running board of an automobile, and of being easily and quickly folded or set up for use.

The invention is fully described in the following specification, and, while it is capable of embodiment in numerous forms, one embodiment thereof is illustrated in the accompanying drawings, in which,—

Figure 1:
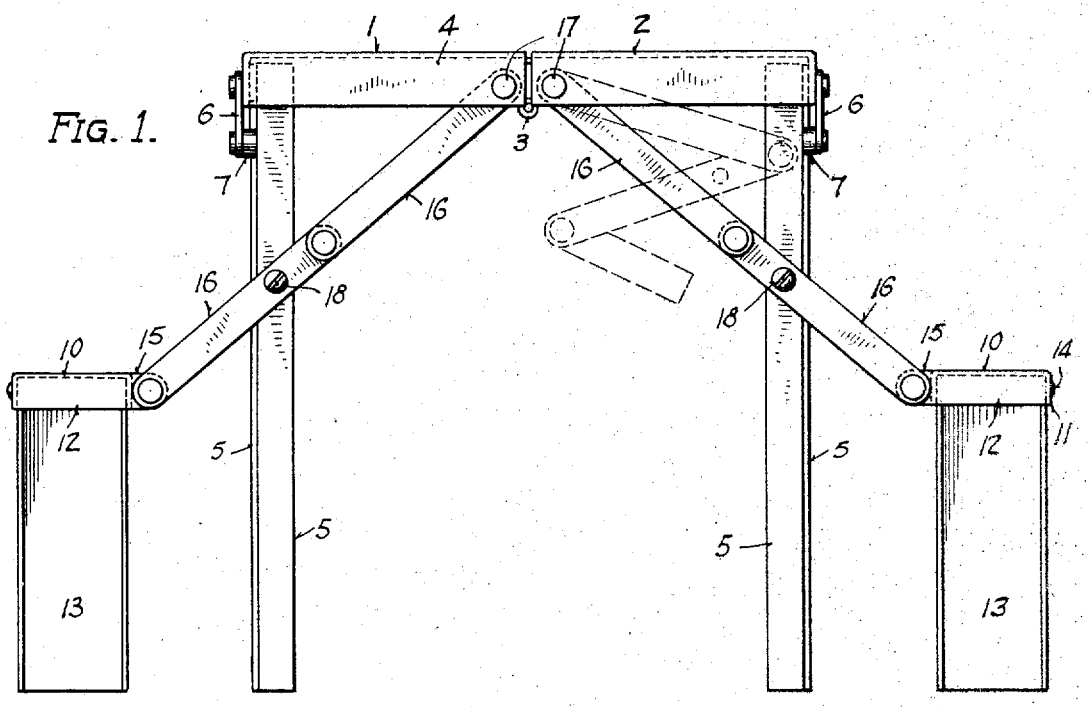
Figure 2:
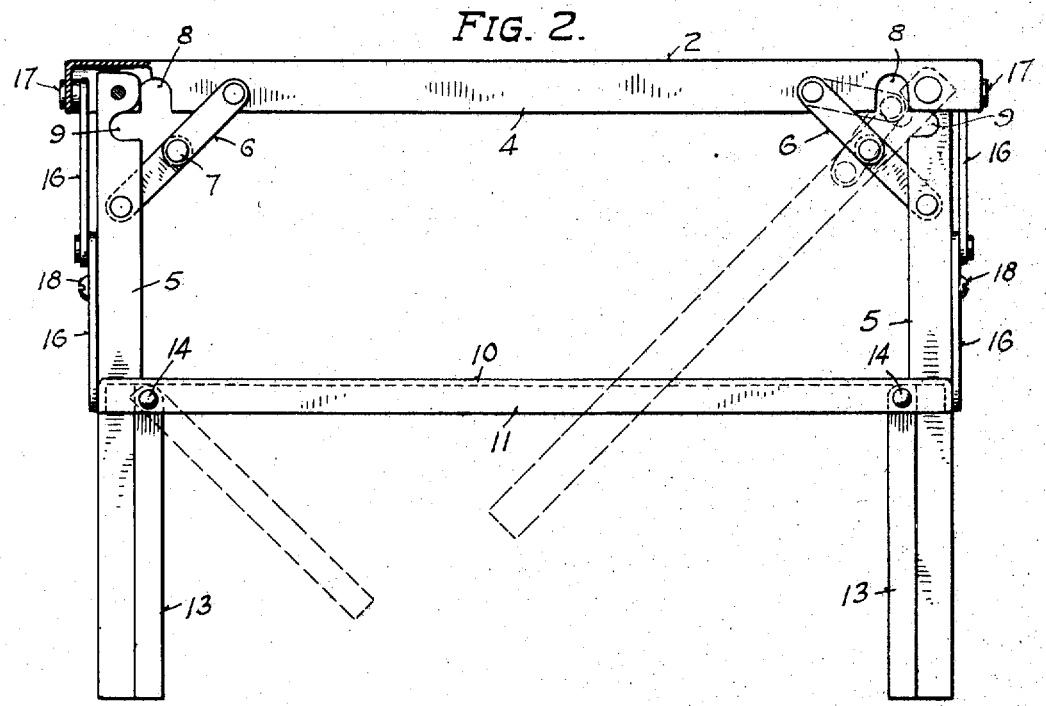
Figure 3:
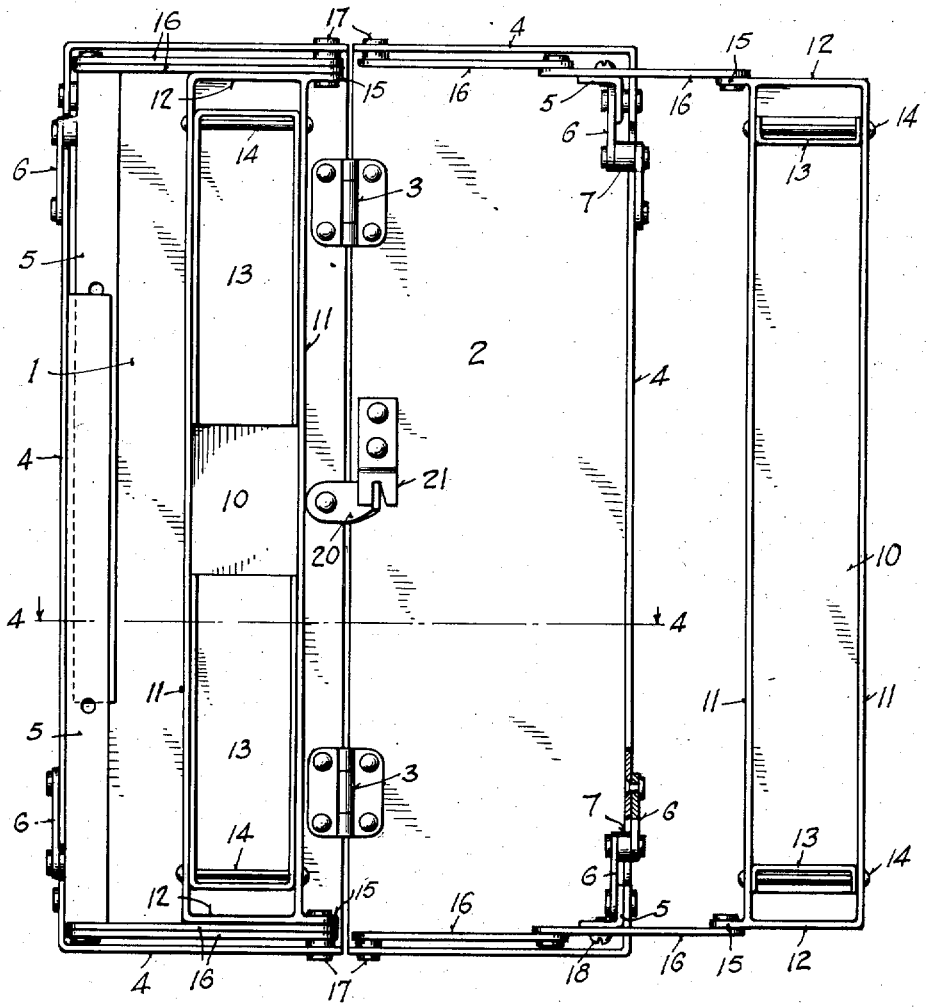
Figure 4:
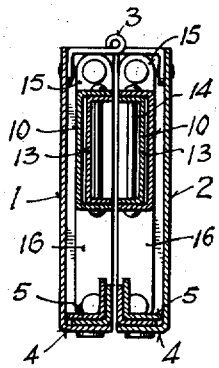

Figure 1 is an end elevation of a table and attached seats in unfolded, usable position and illustrating, by dotted lines, a partial folding of one of the seats. Fig. 2 is a side elevation thereof with a part broken away and with parts shown in dotted lines as partially folded. Fig. 3 is a bottom view of the device with one seat shown as completely folded within its table section, and Fig. 4 is a cross section of the device on the line 4, 4 in Fig. 3 with all of the parts completely folded.

Referring to the drawings, 1 and 2 designate two table top sections, which are of rectangular form and connected together at their inner edges for folding movement, one upon the other, by hinges 3. These table sections are provided, at their outer end and side edges with depending flanges 4, and, for the purpose of strength and durability, each section is preferably formed of a heavy grade of sheet metal, with the under and outer side edges thereof turned down to form the flanges 4. The hinges 3 are secured to the under sides of the table section, with their pivots downwardly offset from the plates forming the sections, so that, when the sections are folded, the flanges 4 thereof will have edge abutment and cooperate with the body, or top portions, of the sections to form a box or housing for enclosing the legs, seats and other parts of the device, as hereinafter described.

A leg 5, preferably of angle iron, is provided at each corner portion of the table top and is pivoted to the outer side edge portion of the flange 4 of each table section, at the inner side thereof, and adjacent to its ends for folding movements lengthwise of such flanged portion, two legs in this manner being attached to each table section. When the pair of legs of the table section are folded, their free end portions lap each other in nesting relation, and, for this purpose, one of the legs is in slightly offset relation to the other within the table section, as shown at the left of Fig. 3. A pair of break-joint toggle links 6 connects each leg 5 to an adjacent portion of the respective flange 4 to retain the leg in set-up position. For convenience of folding, one of the links 6, of each pair, is pivoted at the outer side of the flange 4, and the other is pivoted to its leg at the inner side thereof, and the inner ends of the links are connected in offset relation by a pivot block 7, which when the parts are folded, enters registering notches 8 and 9, provided, respectively, in the associated flange and leg.

A seat 10 is preferably provided for each table section and adapted to be compactly folded within the section at the under side thereof, or projected in usable position without the respective side of the table. Each seat 10 is preferably of narrow elongated bench form, and, for the purpose of strength and durability, is formed of a heavy grade of sheet metal, with the inner and outer edge portions thereof turned down to form side flanges 11, so that the seat is of channel form, and has its end edges turned down to form the end flanges 12. A supporting leg 13 of channel form is pivoted within each end portion of the seat channel and is adapted to fold upwardly in compact form within the channel. The pivot 14 for each leg extends through the seat flanges 11 and the edge flanges of the leg. Each seat 10 is provided, in the present instance at its end, with an inwardly projecting ear 15, which may form a continuation of the inner end of the respective end flange 12 of the seat, and to each ear is pivoted the outer end of a pair of pivotally connected toggle links 16, the inner end of which is pivoted to the adjacent end flange 4 of the table section to which attached near the inner end thereof, as shown at 17. Each toggle link 16 is pivotally connected at its inner end to the inner side of the associated flange 4, and the outer link of the pair laps the outer side of the adjacent leg 5 and is pivotally secured thereto, near the inner end of such link, by a removable bolt, screw, or other connecting member, 18. The members 18 are only used when the table and seats are in set-up position and are removed before folding the device. These are the only parts which it is necessary to remove to permit a folding of the table and seats.

In folding each seat and its associated parts within the respective table section, the legs 13 are first folded against the bottom of the seat and within its channel, if such channel is provided, and the seat is then turned to place it between the outer links of the two pair of toggle links 16 carrying the seat. This having been done, and the bolts 18 removed, the outer links 16 of the connected pairs and the seat are swung under the inner links 16 and the whole doubled up within the flanged under side of the associated table section, as shown at the left side of Fig. 3. When both the seats and the legs have been folded within the respective table sections, the table sections are folded upon each other to place the flanges 4 of the two sections in edge-abutting relation, so as to enclose the table legs and seat parts thereby. This makes a small compact article, which can be carried on the running board of an automobile and requires little space for storing or shipping. When the table is set up, the sections thereof are prevented from folding together by a pivoted catch member 20, on the under side of one, engaging a stationary catch member 21 on the under side of the other, as shown in Fig. 3.

I wish it understood that my invention is not limited to any particular construction or arrangement or form of the parts and is capable of numerous modifications and changes without departing from the spirit of the claims.

What I claim as new and desire to secure by Letters Patent is,—

1. In combination, a table having supporting legs foldably connected thereto, a seat adapted to be disposed at one side of the table, link connections between the seat and the under side of the table top to permit a compact folding of the seat and connections beneath the table in close relation to its top, and means for securing said connections to the adjacent table legs, when the latter are in set-up position, to secure the seat in usable position.

2. In combination, a table having a depending flange around its edge, supporting legs for the table adapted to be folded against the under side of the table within the flange thereof, a seat adapted to be disposed at one side of the table, supporting legs for the seat foldable against the same, connections between the seat and under side of the table, adapted to permit a compact folding of the seat and connections beneath the table adjacent to its top.

3. In combination, a table having hingedly connected top sections adapted to permit a folding of the same, one upon the other, supporting legs foldably carried by the sections, a seat adapted to be disposed in usable position at one side of one top section, supporting legs for the seat, capable of folding thereagainst, and connections between the seat and table adapted to permit a compact folding together of the seat and connections beneath and in close relation to the associated table section and for folding movements therewith relative to the other table section.

4. In combination, a table having a depending flange around its top and having its top composed of two hinged sections adapted to be folded, one on top of the other, with their top sides outermost and with their edge flanges substantially in edge-abutting relation, a seat adapted to be disposed at the outer side of one of said sections, supporting means for the seat, and connections between the seat and adjacent table sections adapted to permit a compact folding together of the seat and connections beneath the table section, within the flange thereof, and to be enclosed by the two table sections when folded together.

5. In combination, a table having its top composed of two hingedly connected sections adapted to be folded together, one upon the other, with their under sides innermost supporting legs for the table top foldable against the sections thereof to which attached, a seat for each table section, means connecting each seat and the respective table section, adapted to permit a positioning of the seat in usable position at the outer side of the section, and also a compact folding of such means and the seat under the table section in close relation thereto to fold with the table section against the other table section.

6. In combination, a table having a depending flange around its edge and comprising two hingedly connected sections adapted to be folded, one against the other, with the edge flanges thereof substantially meeting, supporting legs for the sections foldable thereunder, and a seat connected to each section for compact folding thereunder within the flange thereof.

7. In combination, a table having a depending flange around its edge and comprising two hingedly connected sections adapted to be folded, one on the other, with the edges of their flanges meeting, supporting legs foldably connected to the sections, a seat adapted to be disposed, in usable position, without the other side of each section, supporting legs for each seat foldable thereunder, a foldable connection between the end portions of each seat and the under side of the associated table section adapted to permit a compact folding of the seat and connections beneath the table section, within its flange, for folding movements therewith against the other section, and means for connecting the seat connections and adjacent legs of the table, when the legs are set up, to retain the connections and seat in usable position.

8. In combination, a table having a depending flange around its top and having its top composed of two hinged sections adapted to be folded, one on top of the other, with their top sides outermost and with their edge flanges substantially in edge-abutting relation, seats adapted to be disposed one at the outer side of each of said sections, supporting means for the seats, and connections between each seat and adjacent table section adapted to permit a compact folding together of the seat and its connections beneath the table section, within the flange thereof, and to be enclosed by the two table sections when folded together.

9. In combination, a table having a depending flange around its top and having its top composed of two hinged sections adapted to be folded, one on top of the other, with their top sides outermost and with their edge flanges substantially in edge-abutting relation, seats adapted to be disposed one at the outer side of each of said sections, supporting means for the seats, and connections between each seat and adjacent table section and pivoted at one end to the seat and at the other to the said table section adapted to permit a compact folding together of the seat and its connections beneath the table section, within the flange thereof, and to be enclosed by the two table sections when folded together.

In testimony whereof, I have signed my name at Toledo, this 10th day of July, 1931.

NICK SOLTESZ.